United States Patent [19]

Nickel et al.

[11] 4,321,110
[45] Mar. 23, 1982

[54] SYSTEM FOR LOCATING LEAKS IN THE LINER OF A PRESSURE VESSEL EQUIPPED WITH COOLING TUBES

[75] Inventors: Manfred Nickel, Aachen; Karl H. Escherich, Eschweiler, both of Fed. Rep. of Germany

[73] Assignee: Kernforschungsanlage Jülich GmbH, Jülich, Fed. Rep. of Germany

[21] Appl. No.: 103,223

[22] Filed: Dec. 13, 1979

[30] Foreign Application Priority Data

Dec. 23, 1978 [DE] Fed. Rep. of Germany ....... 2856013

[51] Int. Cl.$^3$ .............................................. G21C 17/00
[52] U.S. Cl. ................................. 376/250; 73/40.5 R
[58] Field of Search .................. 176/19 R, 19 LD, 38, 176/87; 73/40.5, 49.2; 340/605

[56] References Cited

U.S. PATENT DOCUMENTS

| | | | |
|---|---|---|---|
| 3,444,725 | 5/1969 | Chave | 176/38 |
| 3,803,900 | 4/1974 | Maillard | 176/19 LD |
| 3,888,730 | 6/1975 | Jackson | 176/38 |
| 4,032,395 | 6/1977 | Burnette | 176/19 LD |
| 4,076,585 | 2/1978 | Caehera | 176/38 |
| 4,081,323 | 3/1978 | Gans, Jr. et al. | 176/38 |

FOREIGN PATENT DOCUMENTS

| | | | |
|---|---|---|---|
| 2415640 | 10/1974 | Fed. Rep. of Germany | 340/605 |
| 703081 | 1/1954 | United Kingdom | 73/40.5 R |
| 951181 | 3/1964 | United Kingdom | 73/40.5 |
| 1287677 | 9/1972 | United Kingdom | 176/19 R |
| 1373105 | 11/1974 | United Kingdom | 176/19 R |
| 1412516 | 11/1975 | United Kingdom | 176/19 R |

*Primary Examiner*—Salvator Cangialosi
*Attorney, Agent, or Firm*—Frishauf, Holtz, Goodman & Woodward

[57] ABSTRACT

Channels running along the cooling tubes, between the cooling tube and the liner to which the tubes are attached, serve to collect leakage gas through lateral openings connecting the channels to the boundary between the liner and the concrete. These channels can be produced in the extrusion of the cooling tubes and provide considerable saving in the construction of the leak monitoring system as well as efficiency in bringing the leakage detecting channels close to the liner. The channels are connected to a known form of piping tree equipped with valves for determining leak location after the presence of a leak has been found with all the branches connected to the detector unit. A conventional set of perforated pipes embedded in the concrete running at right angles to the cooling tubes may be used to complete the detection raster where large surfaces are to be monitored.

6 Claims, 6 Drawing Figures

FIG. 2A
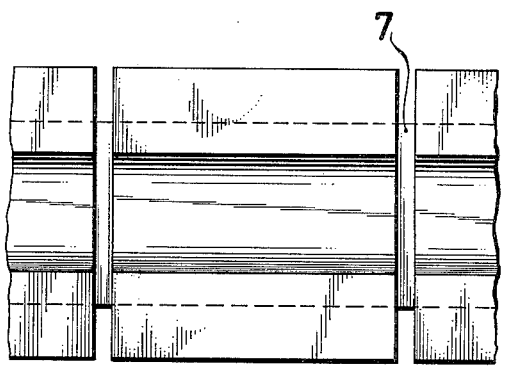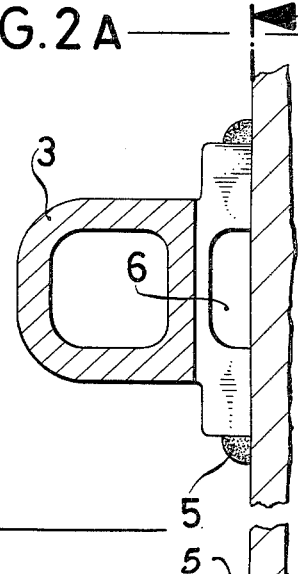
FIG. 2B
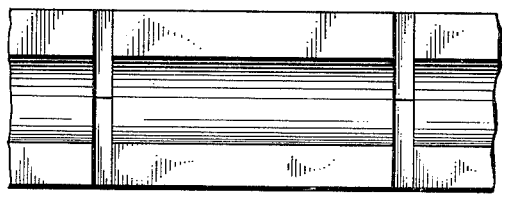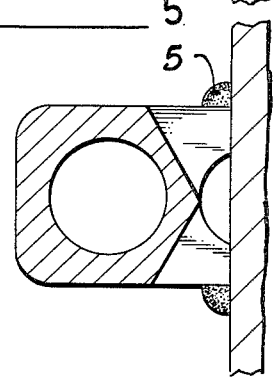
FIG. 2C
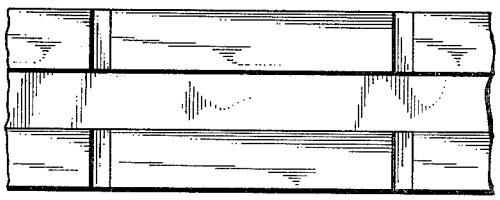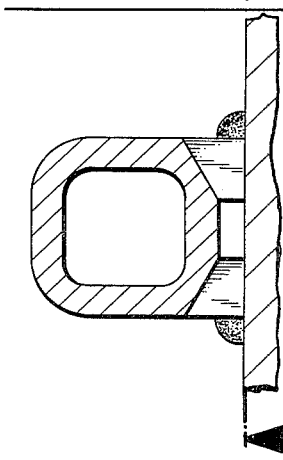

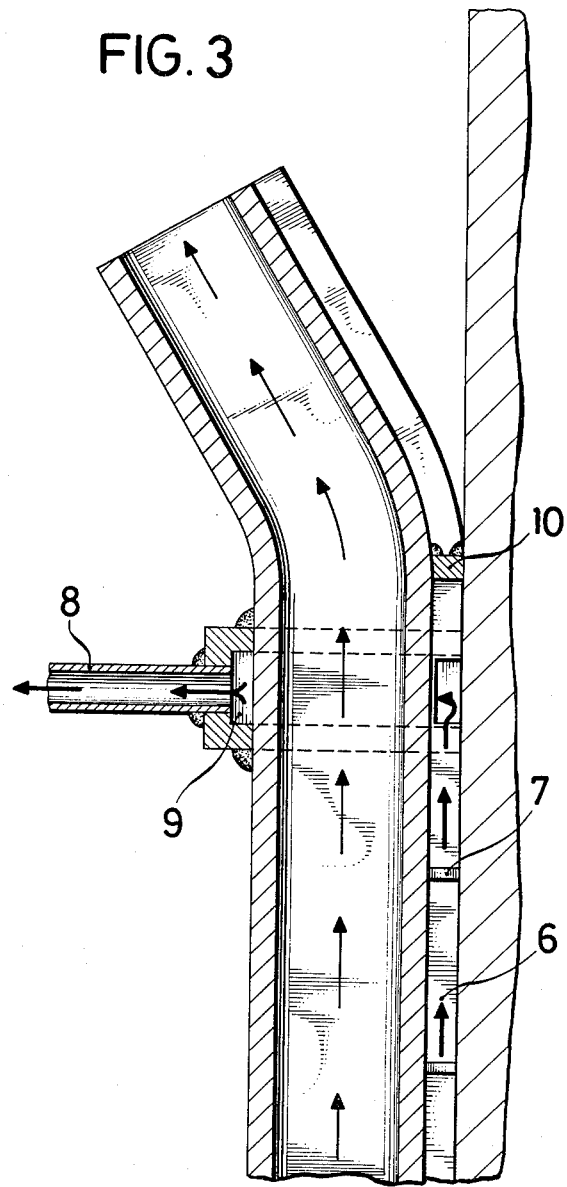

SYSTEM FOR LOCATING LEAKS IN THE LINER OF A PRESSURE VESSEL EQUIPPED WITH COOLING TUBES

This invention concerns the location of leaks in the liner of a pressure vessel, such as a nuclear reactor pressure vessel, in which the liner is equipped with cooling tubes on its outside surface and is surrounded by a concrete casing. The cooling tubes are usually welded to the liner although not necessarily by continuous welds. In such a system, further piping leads from various locations in the cement casing into a selection tree of piping and valves for collecting and suction of helium or some gas leak detector medium to a detection station, so that by manipulating the valves the location of the leak may be determined.

Stressed concrete containers, such are used for gas-cooled high-temperature reactors, are usually equipped with an inner steel coating of thickness in the range of 10 to 20 mm, generally called a liner. This provides a gas-tight sheathing for the stressed concrete pressure container to which it is connected with a close-fitting joint. The liner transmits the internal pressure of the container to the concrete body, and it also serves as a carrier for thermal insulation for the concrete. The metallic sealing skin of the liner is therefore usually provided with a metallic or ceramic insulation as well as a cooling system formed by cooling tubes on the concrete side of the liner lying against the liner and, in many cases, welded thereto.

The impermeability of the liner is essential for the operating integrity of the stressed concrete pressure container. Even small liner defects can lead to limitation of reactor operation or even to shutting down the reactor. Although the liner heretofore has been designed for loading over a certain service life, nevertheless, in consideration of the substantial loads to which the liner is exposed during operation, the occurrence of liner leaks during the service life of a power station utilizing reactors cannot safely be excluded. The important requirement applicable to such systems is accordingly the early recognition and locating of damage to the liner in order that repair can be made promptly and directed to the right place.

A leakage gas getting into the concrete body at a location of liner damage can be used for leak recognition. Leakage location systems have already been developed consisting essentially of perforated piping passing through the concrete casing and involving valves and pipes outside of the casing as well as a vacuum pump and indicator equipment for the presence of helium or of a leakage gas.

It is an object of the present invention to provide a system for locating gas leaks that is more effective and is of practical construction, proceeding from the recognition that leak location can be carried out more quickly, the smaller the spacing of the collection system from the liner and, furthermore, that in the course of time, delaminations at the boundary surface between concrete and liner will be unavoidable.

It is an object of the invention on this basis to provide a particularly simple and effective leak location system that, furthermore, in the case of leakage will provide a drainage effect to mitigate the occurrence of pressurized cracks in the concrete.

SUMMARY OF THE INVENTION

Briefly, the cooling tube system adjacent to the liner is utilized to provide the location of passages for collecting leaking gas to the external portion of a leak location system. Passages running along the length of the cooling tubes between the tubes and the liner, which are open to the concrete casing through lateral openings, are used as the upstream element of the leak-location system, each such passage being connected with a pipe leading to the external location system which, in a known way, includes a valved "tree" network of piping, connected to at least one detector and to a vacuum pump, for detecting the presence of a leak and finding its location.

In a particular form of construction according to the invention, the passages are provided in the form of grooves on the outside of the cooling tube walls, the passages becoming closed, except for the lateral openings, by the attachment, particularly by welding, of the cooling tube structure to the liner. Defined paths are offered directly on the liner surface to the leakage gas, these paths being obtained to a large extent without the requirement of laying additional piping or other extensive disturbance of the structure. It is merely necessary to take care that the channels formed beneath or along the cooling tubes at the liner/concrete interface on the one hand are not closed during the formation of the concrete casing and, on the other hand, maintain open connections to the (concrete) environment. It is further necessary to take precautions to assure that where the cooling tubes are bent away from the liner an appropriately fitting transition of the gas channel to a suction line is provided.

To preserve the integrity of the lateral openings communicating with the cement structure, porous members having an open network of pores, such as pieces of sintered metal powder, may be provided at each lateral opening extending into the area of the junction of concrete and liner. The lateral openings may be slots intersecting the passages running under or along the cooling tubes adjacent to the liner.

BRIEF DESCRIPTION OF THE DRAWINGS

The invention is further described by way of illustrative examples with reference to the annexed drawings, in which:

FIGS. 2a, 2b and 2c each show a cross-section of a particular form of channel and cooling structure adjacent to a liner and a corresponding bottom view of the channel and cooling tube as seen from the side from which it is to be attached to the liner;

FIG. 3 shows a section of a transfer connection from a gas channel to a suction line at a place where a cooling tube separates from the liner.

As shown in FIG. 1, by a section of a portion of its wall, a reactor vessel is constituted by a concrete body 1 having on its inward side a liner 2, equipped with cooling tubes 3 on the side of the liner facing the concrete. A cooling medium, commonly cooling water, circulates through the cooling tubes 3. The liner skin, moreover, is anchored in the concrete body 1 by means of headed dowel rods 4.

The cooling tube system is usually formed of four-sided tubes that lie against the liner and can be welded to the liner, for example, by weld beads 5. These cooling tubes protect the concrete from an accumulation of heat. It is expected that a large surface contact between the tubes and the liner cannot consistently be achieved, as the result of manufacturing tolerances regarding measurements and as the result of welding stresses.

Figure 1:
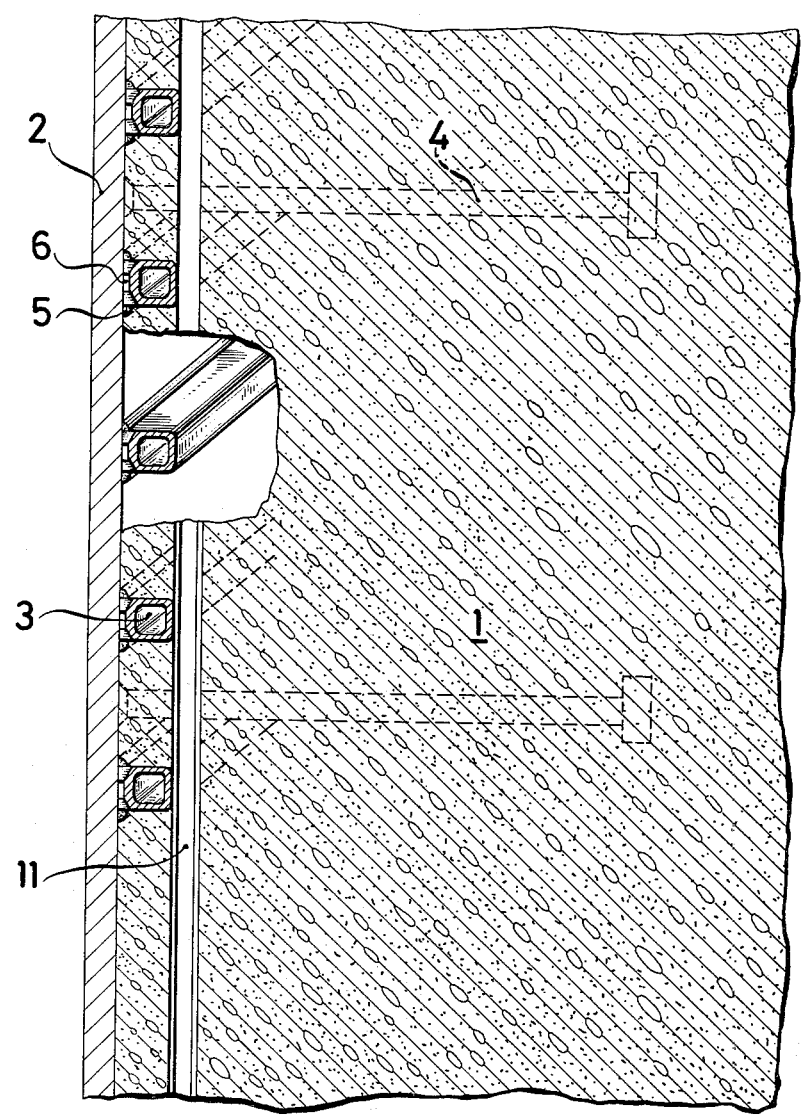
FIG. 1 is a perpendicular section through the portion of the wall of a pressure container consisting of a concrete body and a sheet metal sealing liner.

The tubes illustrated in FIG. 1 do not absolutely need to be solidly connected with the liner, but it is sufficient, rather, if during the pouring and molding of the concrete, care is taken that the contact between cooling tubes and liner is not disturbed by the penetration of concrete masses in between. The cooling tubes could therefore be merely tacked to the liner by spot welds or—so far as usuable material is available, which is either heat resistant or leaves no interfering residues by pyrolytic decomposition—an adhesive can serve to fasten tubes to the liner. Such an adhesive affixation assumes that the adhesive is permeable by gas or that other gas passages such as slots or the like are present through which the leakage gas can pass from the nearby environment to the leakage gas passage to be described below that is provided between the liner and each cooling tube.

The cooling system extends not only over the liner of the core cavity and the adjacent cavities but, also, over the region of the conduit liner and in part also over the liners of connection cavities as, for example, the fuel element supply tubes, control rod tubes, mounting and blower mandrels or stoppers, and so on. The spacing of the tubes from each other corresponds to the thermal loading of the various zones of the liner and generally lie between 100 mm and about 150 mm.

The channels 6 operating as leakage gas paths according to the invention and located preferably beneath the cooling tubes at the boundary between the cooling tubes and the liner are especially provided in the form of grooves along or, in particular, as shown in FIG. 2, in the cooling tube walls, which have corresponding thickening to allow for the grooves. These groove-like channels can be produced quite simply when the tubes are drawn or extruded.

FIGS. 2a, 2b and 2c respectively show different profiles of channels 6 formed in wall thickenings of the tubes. The dimensions of these channels should be so chosen that per tube portion (i.e., within the length of the tube lying alongside the liner) a sufficient thickage gas flow can be obtained by means of a suction system. The channels, moreover, should not be such as to lead to impermissible stressing of the liner in the transfer of pressure outwards by the liner. The latter condition is, however, not to be expected since the channel width can, in any event, be so dimensioned that impermissible loadings are out of the question. The transfer of heat away from the concrete-liner boundary zone is not substantially affected by the presence of the leakage gas channel 6. So far as a direct transfer from the liner to the tube through the weld bead is desired, that is essentially preserved in the illustrated construction and, furthermore, by corresponding forming (see particularly FIG. 2a) it can be provided that in spite of the channel formed facing the liner, a sufficient contact surface remains between the liner and the cooling tube material.

Leakage monitoring of the liner over the entire liner surface requires that the above-described leakage gas channels communicate effectively into the concrete. Such a connection can, for example, be provided by cross-channels produced immediately after extrusion of the tubes by sawed-out slots 7 which extend beyond the weld beads in the case of tubes that are to be welded to the liner, there slots being so narrow that the welded joint is practially not impaired by the presence of the slots. A slot width up to about 3 mm can be readily produced and is bridged without problems when the tubes are welded to the liner.

Care must furthermore be taken to assure that the channels 6 are not blocked up at the slots during the pouring and setting of the concrete, a precaution that can conveniently be accomplished by the introduction of inserts having an open pore structure. Such inserts can, for example, be formed of foamed materials or sintered metal moldings or pressed masses of fibers, such as mineral non woven fabric or extrudably shaped parts made of asbestos. It is also possible by precementing of corners or edges between tube and liner over small surfaces that the channels 6 will not be closed by concrete mix at the time of the main pouring.

In the case of cooling tubes merely lying against the liner instead of welded thereto, the tube-liner boundary surface always remains gas-permeable as the result of unavoidable manufacturing imprecision, so that cross-grooves or the like are not necessary for the lateral openings of the channels running along the cooling tubes. The adjacent mass of concrete can be regarded as gas-permeable but, nevertheless, care should be taken during the pouring of the concrete that the channels 6 remain unobstructed by concrete, for example, by means of a porous covering of the tube-liner transition zone.

Figure 4:
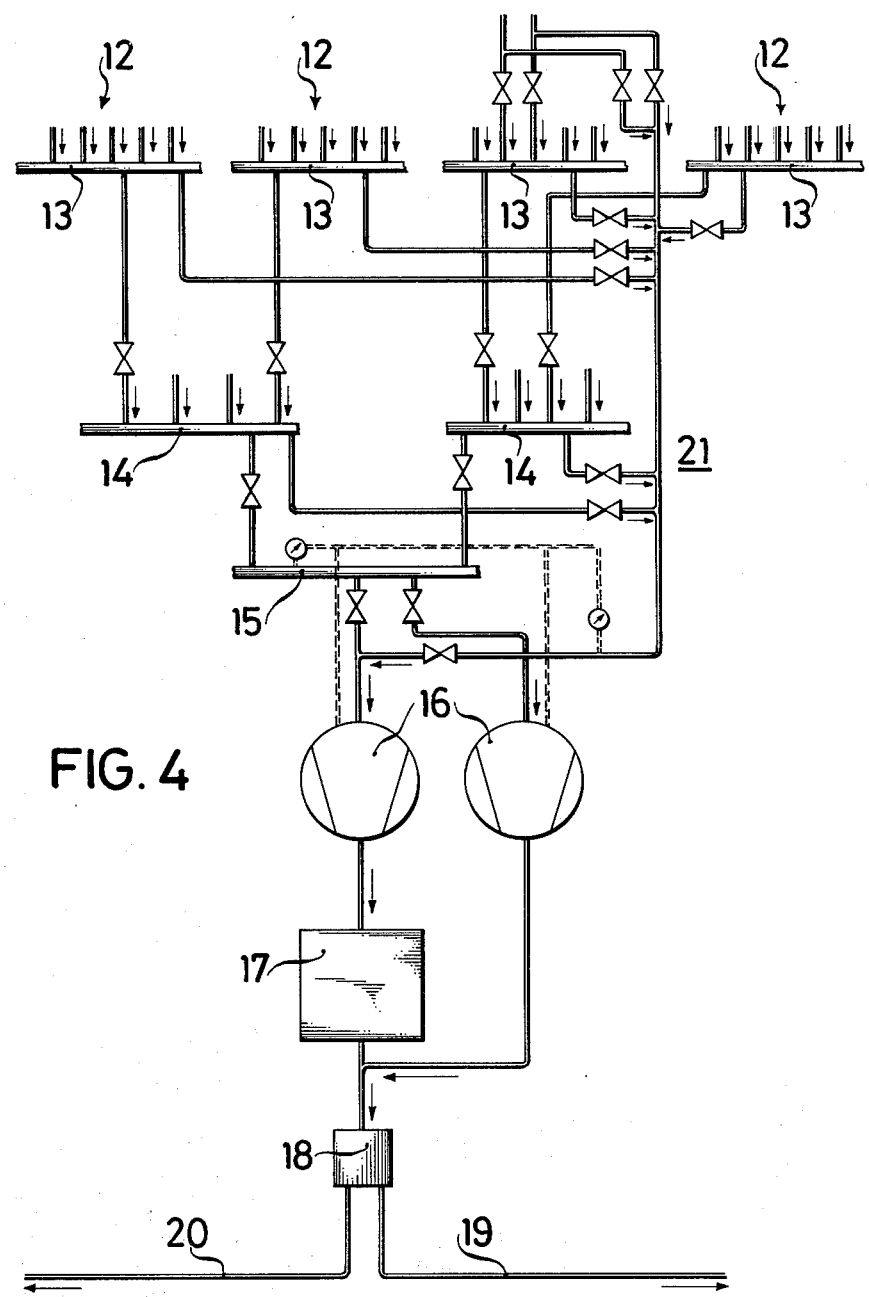
FIG. 4 is a diagram of a portion of the leakage detection and location system which is located outside of the concrete casing of the pressure vessel.

The exit piping of the gas leading out of the concrete can be provided where the cooling tube leaves of the liner, this provision being feasible by conventional tubes 8 (see FIG. 3) with interposition of transition pieces 9 of bell-like form and a porous determination 10 of the leakage gas channel 6, for a suitable transfer of the leakage gas into the tube 8, from which the gas proceeds through collection and valving devices to a detector (see FIG. 4).

The cooling network of the liner makes possible the locating of leak regions in the tube backing direction which is usually sufficient for the locating of damage in smaller reactor cavities such as duct cavities or the like. For large surface containers, on the other hand, additional channels 11 are provided in the usual way in the concrete (see FIG. 1) perpendicular to the cooling tube orientation (mostly in the vertical direction), by the help of which a necessary raster for locating instances of damage can be formed.

For the locating of an instance of damage, the individual leakage gas path must be separately subject to check or measurement, and for this purpose a collection and valving system with associated suction equipment and detection devices, for example, helium detectors in case of core fillings containing helium, as shown in FIG. 4.

Such systems for a systematic checking of individual lines of pipe are in themselves known and need only to be sketched briefly here. Lines 12 arriving from individual liner regions are brought together in so-called "pregatherers" which in turn are connected to intermediate gatherers 14. The main gatherer 15 serves as the final stage from which the gas is brought by means of a suction equipment 16 to a helium detector 17 and thence to radioactivity check station 18, which makes a determination whether the monitored gas should be vented to the atmosphere (by line 19) or to a radioactivity collection point (through the line 20). A locating collector or gather 21 provides the possibility of aspiration and localization in parallel rather than exclusively in sequential operation.

Although the invention has been described with reference to particular illustrative embodiments, it will be understood that variations and modifications are possible within the inventive concept.

The ends of the channels 6 opposite to the suction or gathering side could be closed or obstructed or provided with inlet means analogous to the transition part of the suction side, which inlet means could serve for the controlled supply of a carrier gas.

We claim:

1. A system for locating leaks in the liner of a pressure vessel, such as a nuclear reactor pressure vessel, equipped with cooling tubes adjacent to the outer surface of the liner and with a concrete casing surrounding and in contact with the liner and the cooling tubes, said system comprising:

a set of passages along said cooling tubes and adjacent to said liner, constituted by passages (6) running lengthwise of said tubes and each having a plurality of lateral openings (7) into said concrete casing;

a multiplicity of connecting tubes (8) each connected to one of said passages (6) for leading leaking gas, if any, to the portion of the leak detection system which is located outside the concrete casing, and means located outside said concrete casing for determining whether gas is leaking through said liner into the system and also for determining through which of said connecting tubes said leaking gas is passed.

2. A leak locating system as defined in claim 1, in which said passages (6) are formed by lengthwise grooves in the cooling tube walls contacting the liner.

3. A leak locating system as defined in claim 1, in which transition pieces are provided extending into said concrete casing at said lateral openings along the boundary between said liner and said casing to prevent stopping up of said lateral openings.

4. A leak locating system as defined in claim 3, in which said porous transition pieces are of a sintered metal composition.

5. A leak locating system as defined in claim 1, in which said cooling tubes are welded to said liner on each side of the longitudinal passage for gas located between the tubes and the liner, and in which said lateral openings are provided by cross passages (7) in the form of slots of a width of a few millimeters intersecting the side surfaces of the groove and permeably closed by porous fillings having open pores, said lateral opening slots being a few millimeters deeper than the height of the weld beads (thus oversizing the leg length of the weld).

6. A leak locating system as defined in claim 5, in which said porous fillings are in the form of wedges of sintered metal.

* * * * *